United States Patent [19]
Ohishi et al.

[11] Patent Number: 5,532,813
[45] Date of Patent: Jul. 2, 1996

[54] OPTICAL DISTANCE METER AND LIGHT SOURCE DEVICE USED FOR THE SAME

[75] Inventors: Masahiro Ohishi; Fumio Ohtomo; Kazuaki Kimura; Masaaki Yabe; Yasutaka Katayama; Kazushige Koshikawa; Takeshige Saito, all of Tokyo, Japan

[73] Assignee: Kabushiki Kaisha TOPCON, Tokyo, Japan

[21] Appl. No.: 171,277

[22] Filed: Dec. 21, 1993

[30]     Foreign Application Priority Data

Dec. 21, 1992   [JP]   Japan .................................. 4-356756

[51] Int. Cl.⁶ ............................. G01C 3/08; H01S 3/10; H01L 31/14
[52] U.S. Cl. ...................... 356/5.01; 356/4.01; 356/5.1; 372/9; 372/21; 250/553; 359/599; 385/122
[58] Field of Search ............................. 356/4.01, 5.01, 356/5.1; 250/553; 359/599; 385/122; 372/9, 21

[56]                References Cited
                U.S. PATENT DOCUMENTS

3,751,166   8/1973   Starkey et al. .
3,902,803   9/1975   Lego .
5,091,744   2/1992   Omata ................................... 355/53
5,210,586   5/1993   Grage et al. .
5,335,070   8/1994   Pfiibsen et al. ......................... 359/599

*Primary Examiner*—Stephen C. Buczinski
*Attorney, Agent, or Firm*—Brumbaugh, Graves, Donohue & Raymond

[57]           ABSTRACT

In a light-wave distance meter, a light source device emits reference modulated light beams from multiple spatially-separated light emitting areas, an optical means radiates a light beam derived from the multiple modulated light beams to the target of measurement, a light beam reception means receives the reflected return light beam from the target and converts it into an electrical pulse signal, and a distance measuring means calculates the distance to the target based on the time difference between the light beam emission and the return light beam reception. The low coherence and high intensity light beam produced by the light source device enables the extension of the maximum measurable distance.

8 Claims, 10 Drawing Sheets

INTERFEROGRAM        SPECTRUM

INTERFEROGRAM     SPECTRUM

INTERFEROGRAM

SPECTRUM

OPTICAL DISTANCE METER AND LIGHT SOURCE DEVICE USED FOR THE SAME

BACKGROUND OF THE INVENTION

The present invention relates to an optical distance meter, and particularly to a light-wave distance meter which has a light source having multiple spatially-separated light emitting areas for producing a light beam and has an extended maximum measurable distance based on the low coherence and high luminous intensity light source. The invention also relates to a light source device used suitably for the light-wave distance meter.

Conventional light-wave distance meters are designed to radiate a light beam produced by a light emitting diode (LED) to a corner cube prism that is the target of measurement, receive a returning echo light pulse from the corner cube prism, and calculate the distance to the target based on the time length between the light beam radiation and the return light pulse reception. Each distance meter has its maximum measurable distance determined from the luminous intensity of light source, which is two to three kilometers with the LED light source.

For extending the maximum measurable distance, a conceivable scheme is the use of a high-luminance semiconductor laser. A semiconductor laser of the continuous light emission type is comparable in size and power consumption with the conventional LED and allows direct modulation by the drive current, and therefore it can readily take the place of the LED. Moreover, the continuous semiconductor laser has another advantage of the faster light emission response as compared with the LED, and thus it has a potential capability of accomplishing a light-wave distance meter with enhanced accuracy based on the higher modulation frequency.

A semiconductor laser of the pulsed light emission type has a large peak power, allowing the extension of the maximum measurable distance and the non-prism measurement without using a corner cube prism, although the principle of measurement is different from the distance meter using the continuous semiconductor laser.

However, the above-mentioned conventional light-wave distance meter, either based on the continuous or pulsed semiconductor laser, has a problem of the narrower light emission spectrum and higher coherence as compared with the light-wave distance meter using LED.

The light-wave distance meter is required to have a resolution of distance measurement of 1 mm or less with respect to the modulation frequency or emission pulse width of the light source, which is equivalent to the time difference of the light beam radiation and reception of:

$$1/C \times 2 = 6.6 \text{ psec} \tag{1}$$

where C is the velocity of light.

Assuming that the oscillation frequency is 15 MHz and the continuous modulation is of 50% duty-cycle, the light emission pulse width of the light source is:

$$1/15 \times 0.5 = 33 \text{ nsec} \tag{2}$$

For the distance meter based on the semiconductor pulse laser, a practical emission pulse width is around 20 nsec due to the limit of the drive circuit and element characteristics.

On this account, the conventional light-wave distance meters necessitate the interpolation process for determining the fundamental frequency component of the modulated light or the centroid of the emitted light pulse.

A high-coherence light source can cause the emergence of adverse interference in various sections of the optical system, e.g., the speckle in the multi-mode optical fiber, uneven near field pattern and far field pattern attributable to the speckle in the interior of the multi-mode optical fiber and the speckle at the outlet of the multi-mode optical fiber, the variation of speckle due to the mode jump of the emission wavelength, and the variation in the modulated waveform in the case with the application of luminous modulation.

The light-wave distance meter is vulnerable to the emergence of uneven waveforms attributable to the speckle of the light emission optical system, the variation of speckle caused by the mode jump of the light source, and the emergence of the spatial unevenness of waveform due to the variation of interference of the emitted light caused by the movement of atmosphere. These uneven waveforms shift the centroid of the modulated waveform, resulting in a degraded accuracy of distance measurement.

Although it is necessary to lower the coherence of the light source, the semiconductor laser has its spectral width determined from its structure, and the coherence of the light source cannot simply be diminished.

BRIEF DESCRIPTION OF THE DRAWINGS

FIGS. 3(a)–(e) are a set of diagrams showing the speckle intensity distribution at the outlet 82b of the sending optical fiber 82;

DESCRIPTION OF THE PREFERRED EMBODIMENTS

Figure 1:
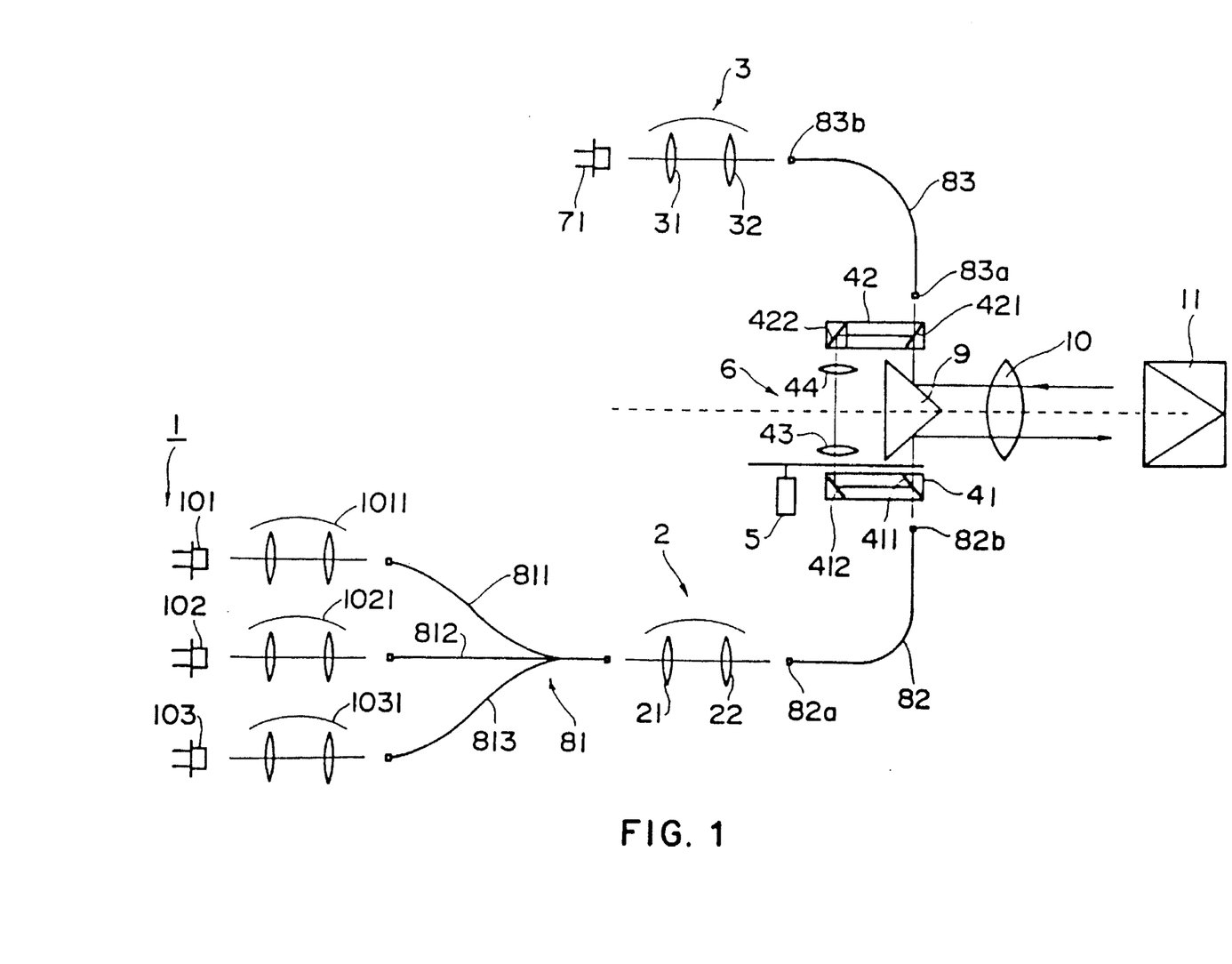
FIG. 1 is a diagram showing the optical system of the light-wave distance meter based on an embodiment of this invention.

The light-wave distance meter based on an embodiment of this invention will be described with reference to the drawings. In FIG. 1, the distance meter consists of a light source 1, a set of first condenser lenses 2, a set of second condenser lenses 3, a pair of split prisms 41 and 42, a light path switching chopper 5, an internal light path 6, an APD 71, an emitting optical fiber 81, a sending optical fiber 82, a receiving optical fiber 83, a prism 9, and an objective lens 10. A corner-cube prism 11 that reflects the light beam radiated from the distance meter is placed at the target position of distance measurement.

The light source 1 consists of a plurality of semiconductor lasers, which include a first semiconductor laser 101, a second semiconductor laser 102 and a third semiconductor laser 103 in this embodiment. Each semiconductor laser 101–103 has a center wavelength which is the primary wavelength of the light emitted by that laser. Each semiconductor laser 101–103 also has a spectrum span which is the range of wavelengths including the center wavelength, of light emitted by that laser. The first semiconductor laser 101 emits a reference modulated light beam with center wavelength $\lambda_1$, the second semiconductor laser 102 emits a reference modulated light beam with center wavelength $\lambda_2$, and the third semiconductor laser 103 emits a reference modulated light beam with center wavelength $\lambda_3$. These three semiconductor lasers 101–103 are energized by a common drive means. Although the light source 1 of this embodiment consists of three semiconductor lasers, an arbitrary number of laser elements may be used.

The first semiconductor laser 101 has a set of emission condenser lenses 1011, by which the modulated light beam is conducted to the inlet of an emitting optical fiber 811. Similarly, the second and third semiconductor lasers 102 and 103 have sets of emission condenser lenses 1021 and 1031, by which the modulated light beams are conducted to the inlets of emitting optical fibers 812 and 813, respectively.

The emitting optical fibers 811–813 have their rear sections bundled to form the emitting optical fiber 81, which serves to merge the modulated light beams from the three semiconductor lasers of the light source 1 and couple the resulting low-coherence secondary light source to the inlet 82a of the sending optical fiber 82 through the first condenser lens set 21 and 22. The emitting optical fiber 81 constitutes an optical guide.

The light source 1, light-source condenser lenses 1011, 1021 and 1031, emitting optical fibers 811, 812 and 813, condenser lenses 21 and 22, sending optical fiber 82, split prism 41, prism 9 and objective lens 10 in combination constitute an optical means. The light source 1 constitutes a light source means, and the emitting optical fiber 81 constitutes a light beam mixer.

The light source 1 consists of three semiconductor lasers, each of which has a narrower spectral width and higher coherence as compared with a light emitting diode (LED). The light path switching chopper 5 operates to switch the light beam path. The APD 71, which constitutes a light beam reception means, is a photosensitive element 7 that detects the light beam emitted by the light source 1.

The split prism 41 consists of a first half-mirror 411 and a second half-mirror 412, and the split prism 42 consists of a first half-mirror 421 and a second half-mirror 422. The split prism 41 is connected to the light source section 1 by the sending optical fiber 82, and the split prism 42 is connected to the light receiving section 7 by the receiving optical fiber 83.

The modulated light beam produced by the multiple semiconductor lasers of the light source 1 is conducted through the emitting optical fiber 81 to the first condenser lenses 21 and 22, by which it is conducted to the inlet 82a of the sending optical fiber 82. The modulated light beam coming out of the outlet 82b of the sending optical fiber 82 is incident to the split prism 41. Part of the modulated light beam passing through the first half-mirror 411 is sent out to the external measuring light path through the light path switching chopper 5, and the rest of the modulated light beam reflected by the first half-mirror 411 and further reflected by the second half-mirror 412 of the split prism 41 is introduced to the internal reference light path through the light path switching chopper 5. Namely, the light path switching chopper 5 operates to switch the internal and external light paths for the modulated light beam.

With the external measuring light path being selected by the chopper 5, the modulated light beam is reflected by the prism 9 and sent out through the objective lens 10 to the distant target. The modulated light beam radiated by the objective lens 10 is reflected by the corner-cube prism 11 and comes back as a return light beam to the objective lens 10, through which it is incident to the prism 9. The return modulated light beam is reflected by the prism 9, and part of it passing through the first half-mirror 421 of the split prism 42 is conducted to the inlet 83a of the receiving optical fiber 83.

With the internal reference light path 6 being selected by the chopper 5, the modulated light beam is conducted through it to the split prism 42. The light beam is reflected by the first and second half-mirrors 421 and 422 incorporated in the split prism 42, and conducted to the inlet 83a of the receiving optical fiber 83.

The modulated light beam coming out of the outlet 83b of the receiving optical fiber 83 is conducted to the APD 71 by the second condenser lenses 31 and 32, and it is transduced into an electrical pulse signal by the photosensitive element 7.

The light path formed of the first half-mirror 411, prism 9, objective lens 10, corner-cube prism 11, objective lens 10, prism 9 and first half-mirror 421 constitutes the external measuring light path. The light path formed of the first and second half-mirrors 411 and 412, condenser lenses 43 and 44, second half-mirror 422 and first half-mirror 421 constitutes the internal reference light path 6.

Figure 2:
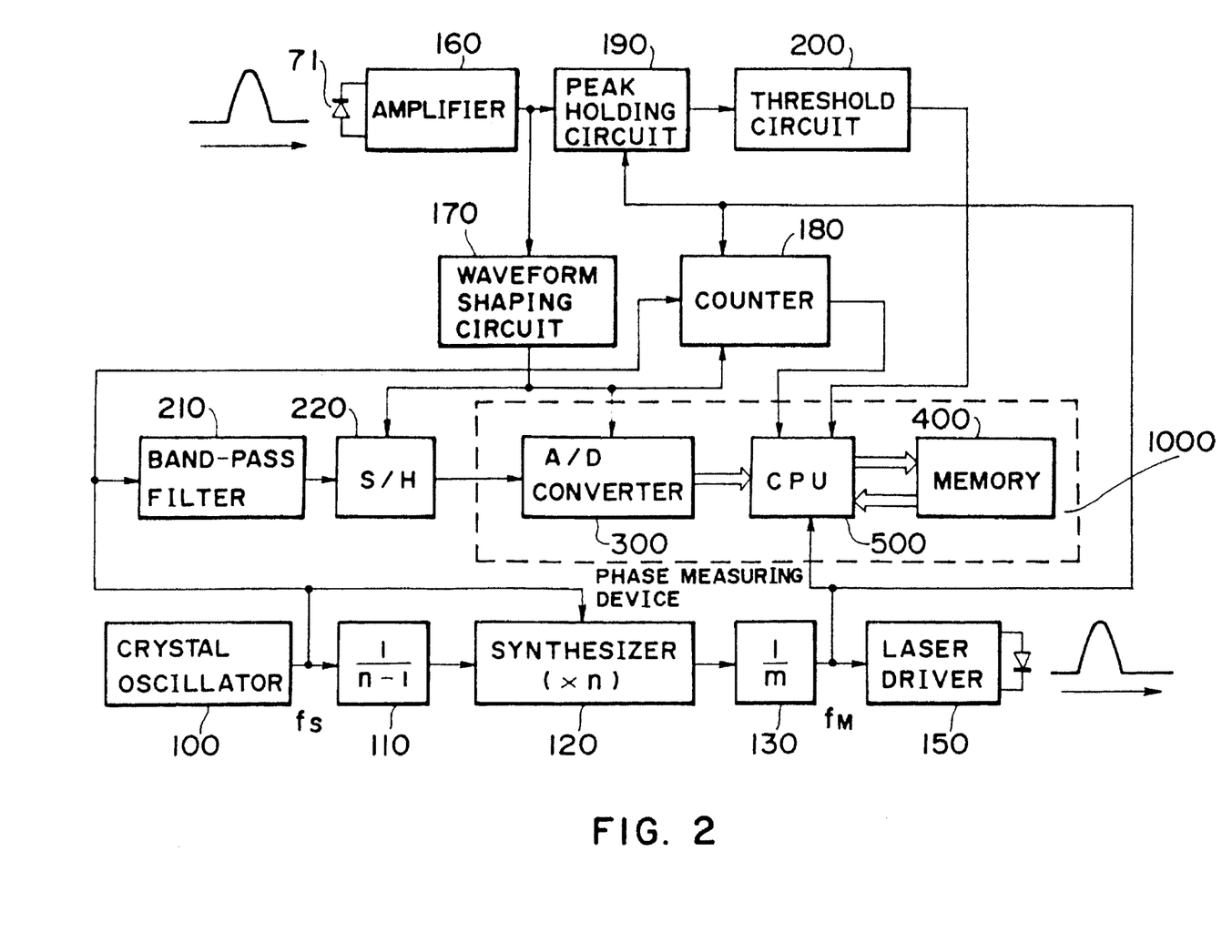
FIG. 2 is a block diagram of the electric circuit of the distance meter.

Next, the electric circuit of this distance meter will be explained with reference to FIG. 2. The circuit consists of a crystal oscillator 100, a first frequency demultiplier 110, a synthesizer 120, a second frequency demultiplier 130, a semiconductor laser driver 150, an APD 71, an amplifier 160, a waveform shaping circuit 170, a counter 180, a peak holding circuit 190, a threshold circuit 200, a band-pass filter 210, a sample-holding circuit (S/H) 220, an A/D converter 300, a memory 400, and a CPU 500.

The crystal oscillator 100, which is one of reference signal generation means, generates a reference signal of 15 MHz. The reference signal is fed to the first frequency demultiplier 110, synthesizer 120, band-pass filter 210 and counter 180. The first frequency demultiplier 110 demultiplies the frequency of the reference signal by 1/100 and delivers the resulting 150-kHz signal to the synthesizer 120.

The synthesizer 120 produces a 15.15-MHz signal from the 150-kHz signal provided by the first frequency demultiplier 110 and the 15-MHz reference signal provided by the crystal oscillator 100, and delivers the 15.15- MHz signal to the second frequency demultiplier 130. The second frequency demultiplier 130 demultiplies the 15.15-MHz signal by 1/5000 to produce a 3030 Hz signal, and delivers it to the laser driver 150. The output signals of the first and second frequency demultipliers 110 and 130 and synthesizer 120 are two-level signals. The semiconductor laser driver 150 energizes the first, second and third semiconductor lasers 101–103 of the light source 1.

The modulated light beams emitted by the light source 1 is conducted through the optical system and received by the APD 71. The APD 71 is one of photosensitive elements, and it bases the operation on the avalanche amplification through the application of a deep bias to its pn junction. The APD 71 receives the modulated light beam conducted through the internal reference light path and the modulated light beam conducted through the external measuring light path.

The APD 71 transduces the modulated light beams into an electric signal and applies it to the amplifier 160. The amplifier 160 delivers the amplified reception signal to the waveform shaping circuit 170 and peak holding circuit 190. The waveform shaping circuit 170 delivers its output to the sample-holding circuit (S/H) 220 and counter 180. The counter 180 measures the time difference between the light beam radiation and reception by counting the 15-MHz reference signal provided by the crystal oscillator 100.

The band-pass filter 210 produces a sinusoidal wave from the 15-MHz reference signal provided by the crystal oscillator 100, and sends it to the sample-holding circuit 220. The sample-holding circuit 220 samples and holds the received signal from the waveform shaping circuit 170, the output of which is converted into digital data by the A/D converter 300 and the data is stored in the memory 400 in response to the conversion completion signal issued to the CPU 500.

The foregoing series of operations from the light beam emission by the light source 1 to the storing of data in the memory 400 is carried out for the external measuring light path and internal reference light path. As a result, the phase difference ø between the waveform of the converted data of the internal reference light path and the waveform of the converted data of the external measuring light path represents the difference of distances of the two light paths. Both waveform data are rendered the Fourier transformation to extract the phase information of the fundamental component, and a fine measurement distance to the target is evaluated from the phase difference at a resolution of 10 meters or less. A coarse measurement distance to the target is evaluated at a resolution of 10 meters from the difference of count values of the counter 180 for the internal reference light path and external measuring light path. Combining the coarse measurement distance and fine measurement distance makes the conclusive distance from the distance meter to the corner-cube prism at the target of measurement. The circuit arrangement that implements the foregoing operations constitutes a distance measuring means.

Next, the light source of this invention will be explained in more detail. The light source 1 consists of three semiconductor lasers. Since the semiconductor laser has a narrower spectral width and higher coherence as compared with the light emitting diode (LED), it involves a problem of the emergence of speckles caused by the interference in many sections of the optical system.

FIG. 3 shows the speckle intensity distribution at the outlet 82b of the sending optical fiber 82. A speckle is a pattern of spots appearing when a laser beam is projected on to the surface of plastics or metal. Reflected light components from many surface portions interfere with each other. The speckle of light at the outlet of an optical fiber represents the standing wave of the light in the radial direction of the optical fiber, and it varies depending on the diameter and numerical aperture NA of the optical fiber and the light wavelength. When an angle θ is given by an optical axis of light of which aperture is maximum among light coming out of the point on the optical axis, the numerical aperture NA is expressed as: NA=n×sin θ. The numerical aperture NA of the optical fiber is referenced to design the objective lens set which introduces the light beam into the optical fiber efficiently.

Figure 3A:
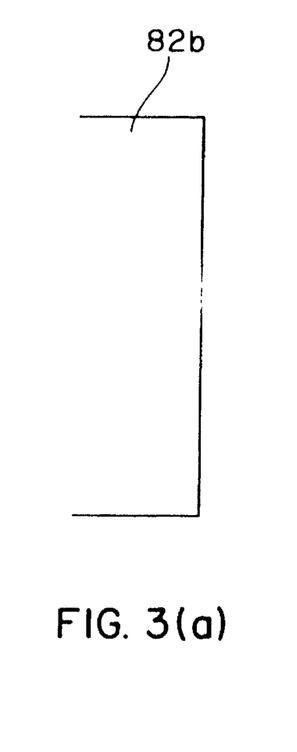
Figure 3B:
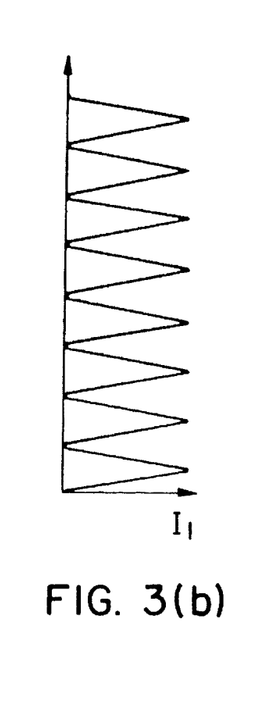
Figure 3C:
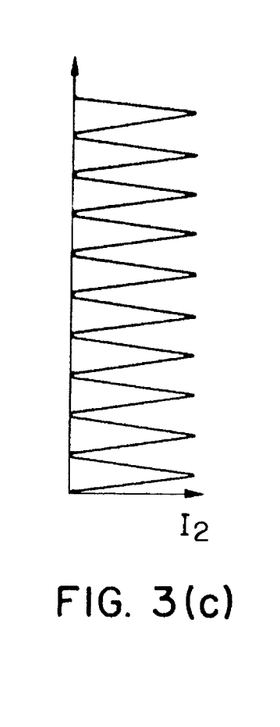
Figure 3D:
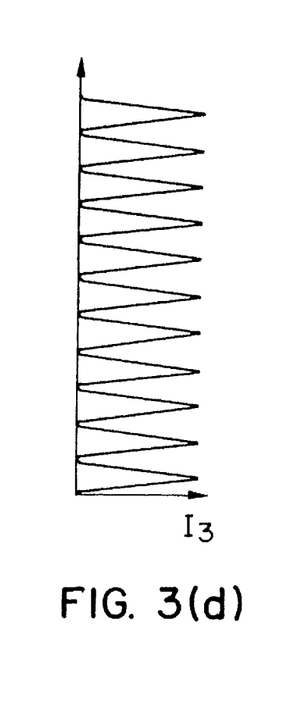

FIG. 3(a) shows the outlet section 82b of the sending optical fiber 82. FIGS. 3(b), 3(c) and 3(d) show the spectrums of speckles created by the modulated light components with the center wavelengths $\lambda_1$, $\lambda_2$ and $\lambda_3$ from the first, second and third semiconductor lasers 101, 102 and 103, respectively. The luminous intensity I is plotted against the radial position of the optical fiber. These figures reveal a high contrast of luminance attributable to the narrow spectrum of the semiconductor laser.

The actual speckle at the outlet 82b of the sending optical fiber 82 is the sum of these speckles. Because of different pitches of spectrum patterns due to different center wavelengths among the semiconductor lasers 101, 102 and 103, the total spectrum is averaged and the contrast of speckle can be reduced as shown in FIG. 3(e).

Although the contrast of speckle can possibly decrease owing to the separate disposition of light emitting areas, these semiconductor lasers have their wavelengths shifted intentionally, according to this embodiment, thereby to ensure the reduction of the contrast of speckle.

Another improper property of the semiconductor laser is the jumping (hopping) from one oscillation mode to another momentarily. In regard to this matter, the variation of spectrum caused by the emergence of mode jump of one semiconductor laser does not much affect the total spectrum because of the use of three independent semiconductor lasers according to this embodiment.

Figure 4A:
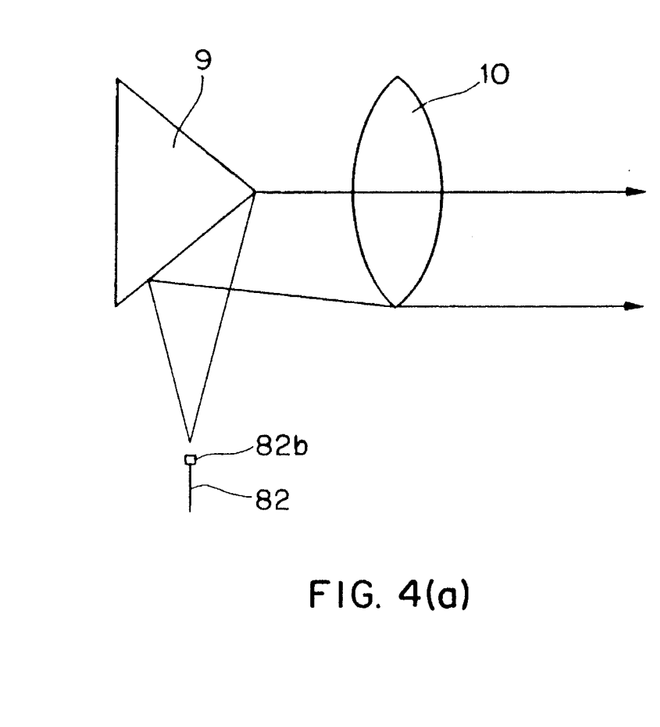
FIGS. 4(a)–(e) are a set of diagrams showing the speckle intensity distribution in the radiation optical system.
Figure 4B:
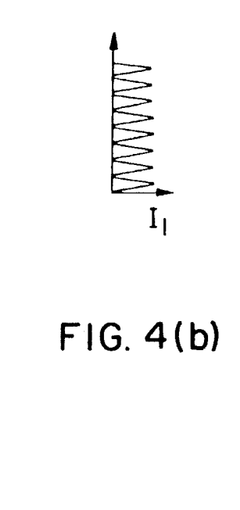
Figure 4C:
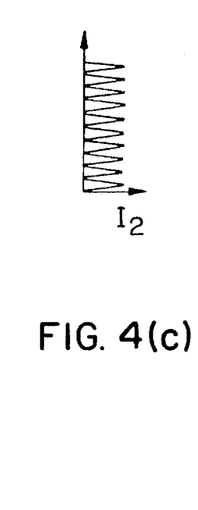
Figure 4D:
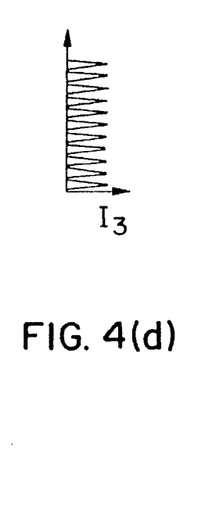
Figure 4E:
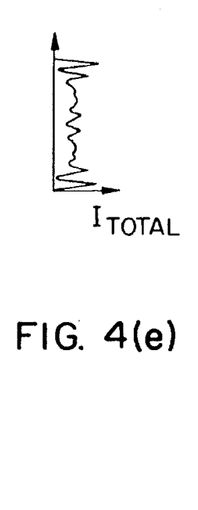

The speckle also appears for the light beam radiated from the objective lens 10 to the corner-cube prism 11. FIG. 4(a) shows the light beam radiation optical system. FIGS. 4(b), 4(c) and 4(d) show the spectrums of speckles created by the modulated light components with the center wavelengths $\lambda_1$, $\lambda_2$ and $\lambda_3$ from the first, second and third semiconductor lasers 101, 102 and 103, respectively. The total speckle appearing at the exit of the radiation optical system is the sum of these speckles originating from the individual semiconductor lasers also in this case as shown in FIG. 4(e), and the contrast of speckle can be reduced by employment of a light source 1 consisting of multiple semiconductor lasers.

Figure 5:
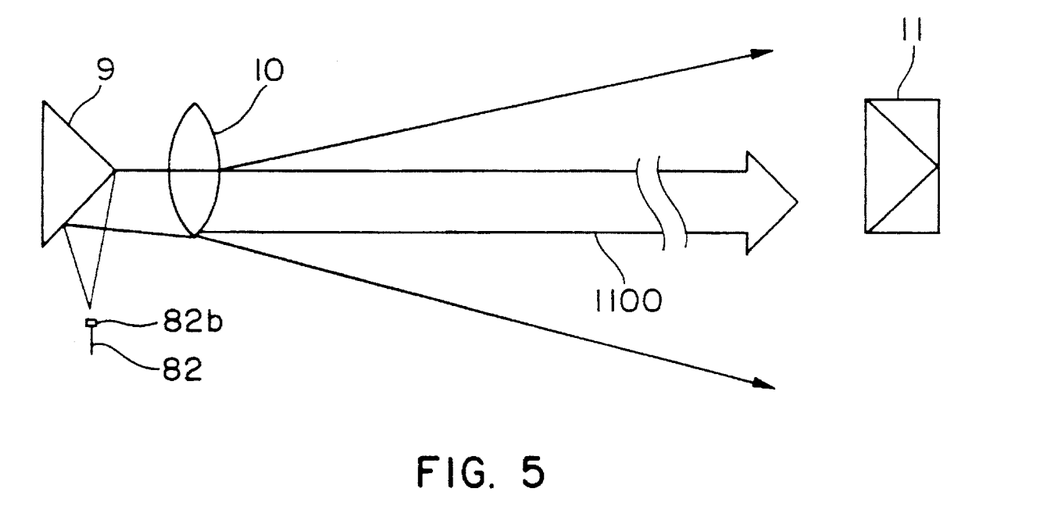
FIG. 5 is a diagram used to explain the influence of the atmosphere on the propagation of the light beam radiated from the light-wave distance meter.

FIG. 5 shows the influence of the atmosphere on the propagation of the light beam radiated from the light-wave distance meter. The refractive index of the aerial light path varies depending on the air temperature, atmospheric pressure and humidity. Particularly, during the daytime, the refractive index of the atmosphere becomes spatially uneven due to the radiation of sunbeams and it also varies with time, creating the schlieren. The variation of the refractive index of atmosphere affects the velocity of light, which results in a varied optical distance. This adverse influence of the atmosphere is more serious in measuring longer distances.

The following examines a light beam component 1100 which is reflected by the corner-cube prism 11 among the light beam radiated by the distance meter as shown in FIG. 5. If part of the light beam 1100 has its optical distance varied due to the movement of atmosphere, it will cause the interference of light beam at the time of reception by the distance meter. The movement of atmosphere varies with time, and therefore the interference of light beam at the reception also varies with time and the varied modulation waveform degrades the accuracy of measurement.

According to this embodiment, however, the three semiconductor lasers 101–103 have different center wavelengths, and therefore they are affected differently by the variation of optical distance caused by the atmospheric turbulence. Consequently, the total waveform variation at the reception of the return light beam can be alleviated.

Figure 6A:
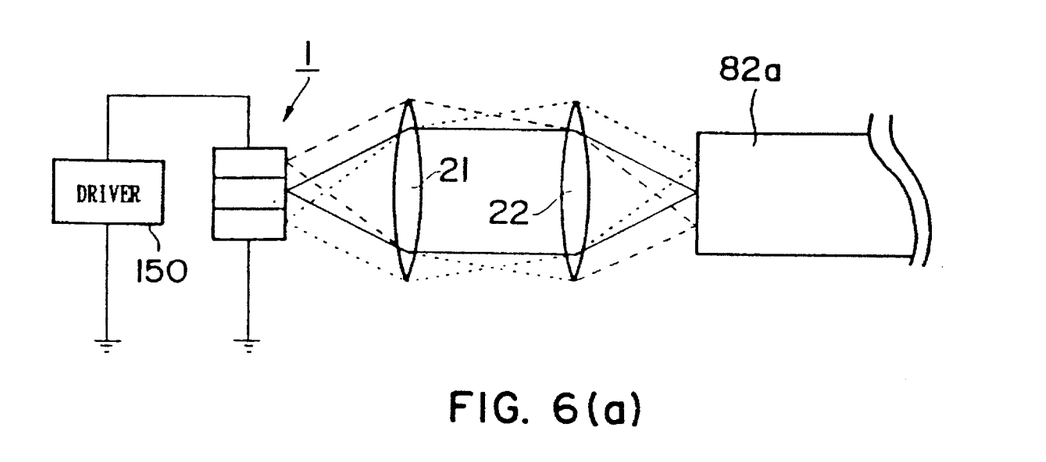
FIGS. 6(a) and (b) are a set of diagrams explaining variant light source devices.

The light beam emission optical system of this embodiment shown in FIG. 1, in which the three independent semiconductor lasers 101–103 with associated condenser lenses 1011, 1021 and 1031 are disposed separately, their light paths are unified through the optical fibers 811–813 and the unified light path is coupled to the inlet 82a of the sending optical fiber 82 by the condenser lenses 21 and 22, may be replaced with the arrangement shown in FIG. 6(a), in which three semiconductor lasers are piled to form a light source 1 and emitted three light beams are conducted to the inlet 82a of the sending optical fiber 82 through a single set of condenser lenses 21 and 22.

Figure 6B:
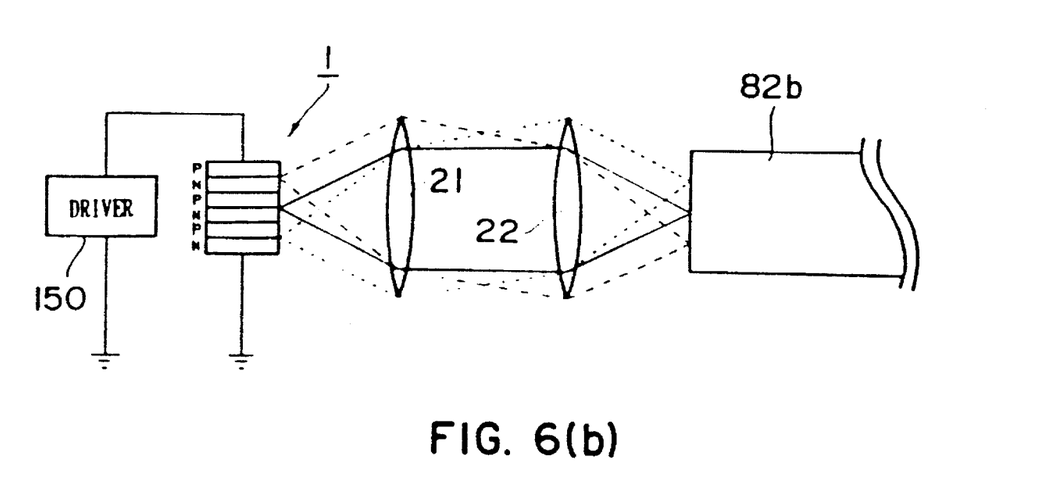

Alternatively, the light source 1 may be replaced with a single semiconductor laser having multiple light emitting areas as shown in FIG. 6(b). The arrangements of the light source 1 shown in FIGS. 6(a) and 6(b) enable the reduction of electrical and optical component parts and the enhancement of the luminance of the light source.

Next, the relationship between the center wavelengths of the semiconductor lasers 101–103 and the coherence of the resulting secondary light source at the outlet 82b of the sending optical fiber 82 will be examined. The reason for the suitable use of LED for the light-wave distance meter is its very wide emission spectrum and low coherence. Owing to this property of LED, the waveform variation in the sending optical fiber 82 and the atmosphere is negligibly small in terms of the accuracy of the light-wave distance meter.

Figure 7A:
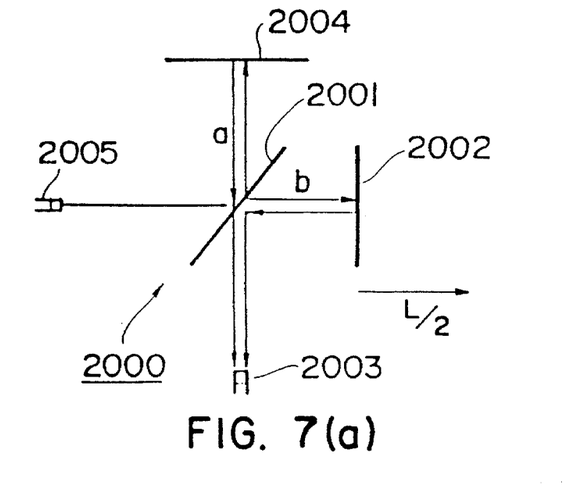
FIGS. 7(a)–(c) are a set of diagrams used to explain the Michelson interferometer.

Generally, the coherence with respect to the spectrum span is assessed through the observation of the interferogram provided by Fourier spectroscopy. A Michelson interferometer 2000 shown in FIG. 7 is used for this measurement, and it consists of a beam splitter 2001, a movable plane mirror 2002, an optical sensor 2003, a stationary plane mirror 2004, and a light source 2005.

A light beam emitted by the light source 2005 is diverted to light paths a and b by the beam splitter 2001. The light beam on the light path a is reflected by the stationary plane mirror 2004, and it goes through the beam splitter 2001 and reaches the sensor 2003. The light beam on the light path b is reflected by the movable plane mirror 2002 and reflected again by the beam splitter 2001, and it reaches the sensor 2003.

Figure 7B:
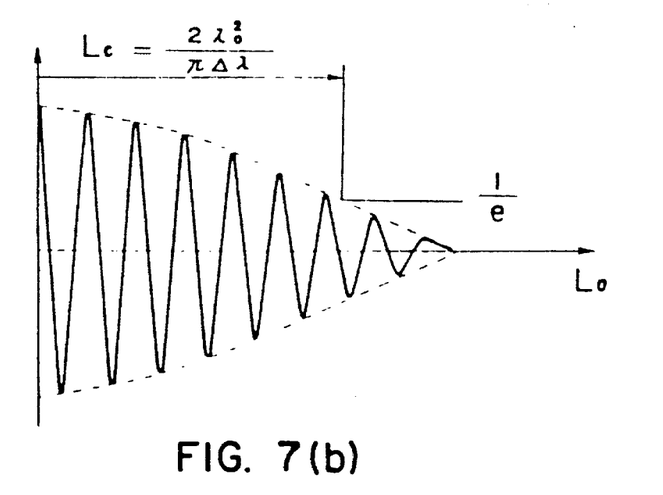
Figure 7C:
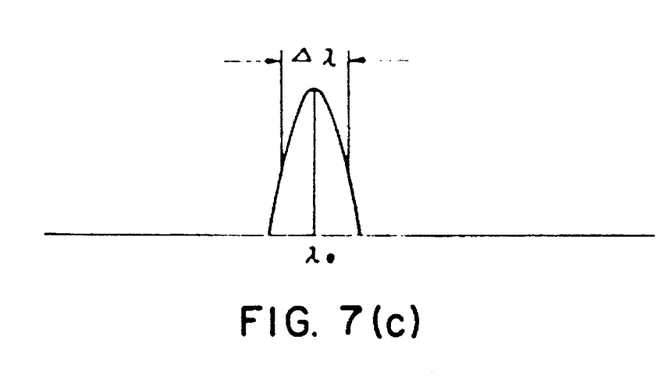

The luminous intensity detected continuously by the sensor 2003, while the movable plane mirror 2002 is moved, as shown in FIG. 7(b) is called "interferogram". The luminous intensity is plotted on the vertical axis against the light path length, which varies as the plane mirror 2002 moves, on the horizontal axis. Through the rendition of Fourier transformation for the waveform of FIG. 7(b), the spectrum of the light source 2005 is obtained as shown in FIG. 7(c). The Fourier spectroscopy is to assess the coherence of light with respect to the spectrum span. FIGS. 7(b) and 7(c) show the relationship between the interferogram and the spectrum span of the light source. In the case of a monochromatic light emitted by the light source 2005, the interferogram has the shape of the cosine function, and it turns to the sinc function as the light quality approaches the white light.

The positive relationship between the emission spectrum of the light source and the interferogram enables the assessment of the coherence of the light source based on the interferogram.

In the case of a spectrum having the shape of Gaussian distribution, the coherence distance Lc, center wavelength $\lambda$ and spectral width $\Delta\lambda$ are related with each other as shown in FIGS. 7(b) and 7(c), which is expressed as follows.

$$Lc = (2\lambda^2)/(\pi(\Delta\lambda)^2) \qquad (3)$$

In the case of an LED light source having a center wavelength of $\lambda=850$ nm and a spectral width of $\Delta\lambda=50$ nm, the coherence distance is evaluated to be:

$$Lc = 9 \mu m \qquad (4)$$

In the case of a semiconductor laser having a center wavelength of $\lambda=850$ nm and a spectral width of $\Delta\lambda=5$ nm, the coherence distance is evaluated to be:

$$Lc = 90 \mu m \qquad (5)$$

Figure 8A:
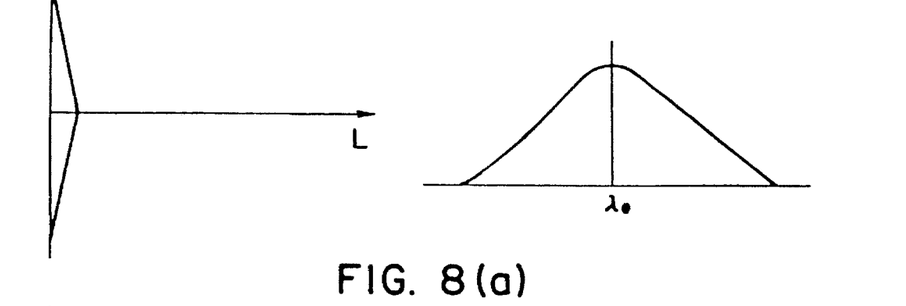
FIGS. 8(a)–(d) are a set of diagrams showing interferograms resulting from several light source spectrums.

The relationship between the spectrum of light source and the interferogram will further be explained with reference to FIG. 8. In the case of using multiple semiconductor lasers for the light source, the variation of interferogram dependent on the setting of center wavelengths of lasers is known through the rendition of inverse Fourier transformation for the spectral distribution. FIG. 8(a) shows the relationship of the interferogram (only envelope is shown) and the spectrum of a single-LED light source, FIG. 8(b) is the case with multiple semiconductor lasers having an equal center wavelength, and FIG. 8(c) is the case with multiple semiconductor lasers with their center wavelengths shifted by the amount of the spectrum span.

Figure 8B:
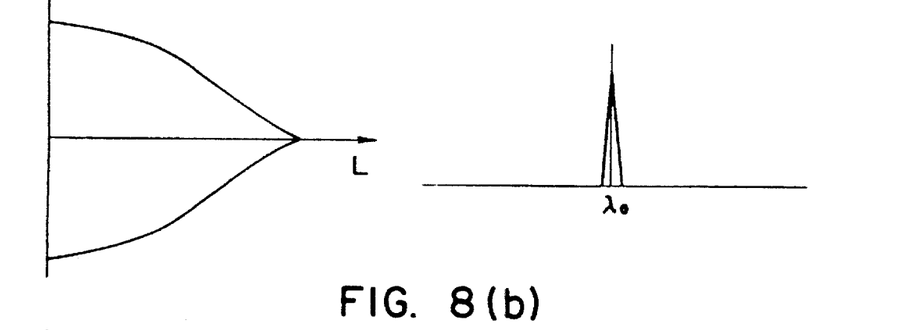
Figure 8C:
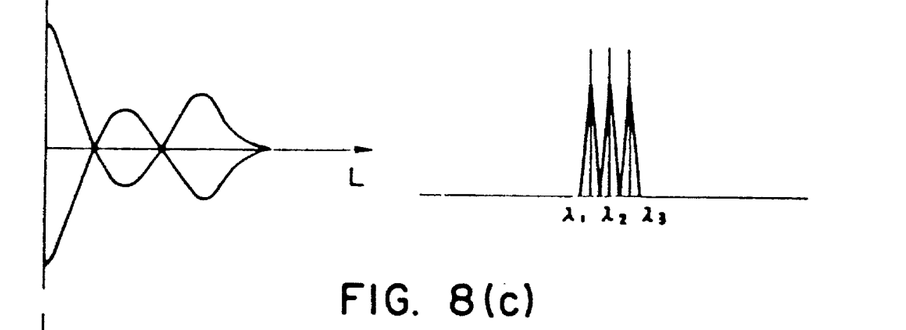
Figure 8D:
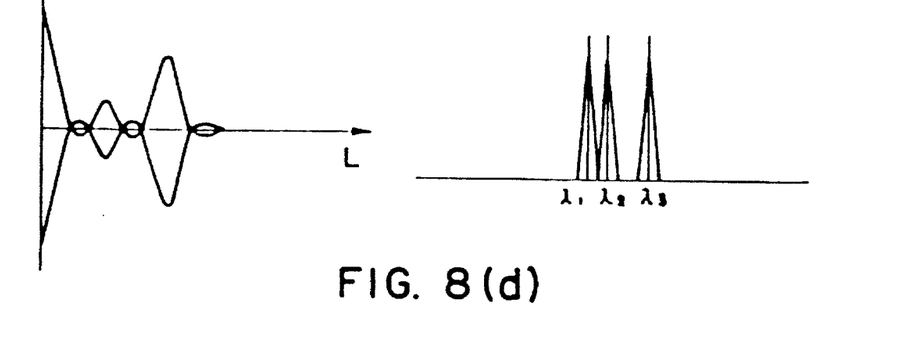

These interferograms reveal that when multiple semiconductor lasers having the same center wavelength are used, the interference occurs in a significantly long range (FIG. 8(b)) as compared with the case of a single LED (FIG. 8(a)). In the case of multiple semiconductor lasers with their center wavelengths shifted by the amount of the spectrum span, the range of interference decreases to about ⅓, although the secondary interference arises (FIG. 8(c)), relative to the case of multiple semiconductor lasers having the same center wavelength (FIG. 8(b)).

Next, the interferogram of the emission optical system based on the secondary light source derived from three separate componential light sources, with their center wavelengths being shifted by the amount of a half or less of the spectrum span (i.e., spectrums partly overlap), will be explained with reference to FIG. 9.

Figure 9A:
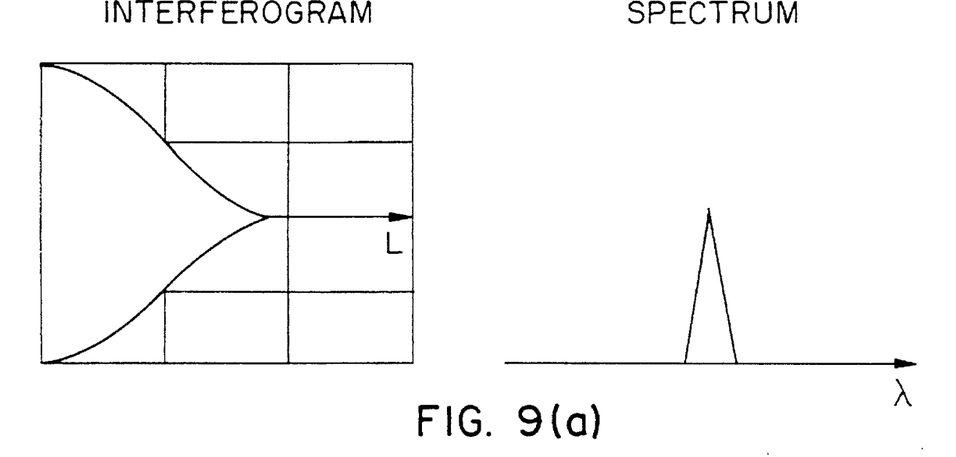
FIGS. 9(a)–(c) are a set of diagrams each showing an interferogram resulting from a spectrum of three componential light sources.
Figure 9B:
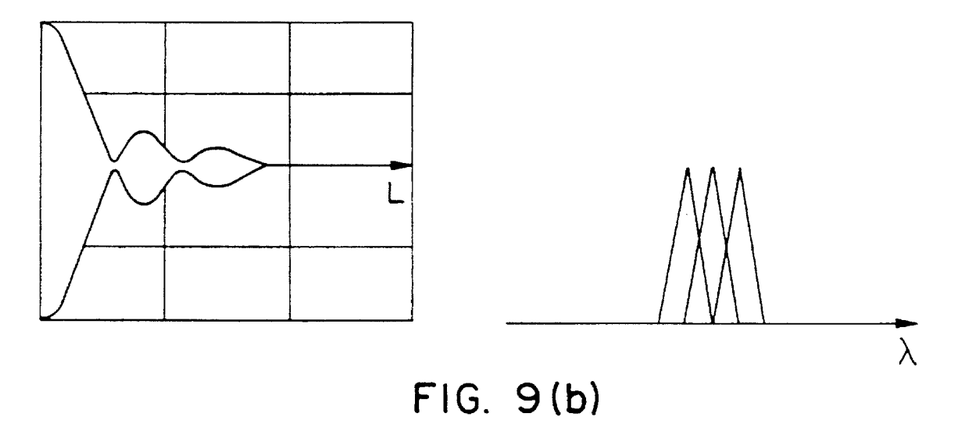
Figure 9C:
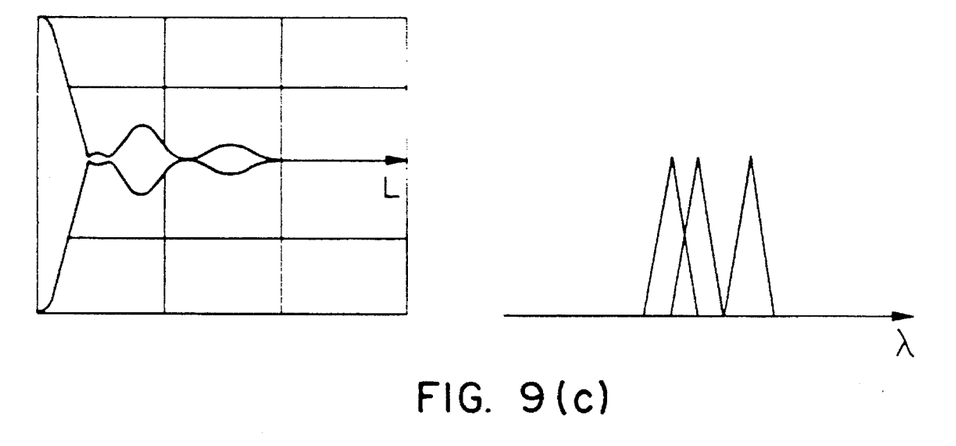

FIG. 9(a) shows the interferogram of the case of three componential light sources having the same center wavelength, FIG. 9(b) shows the case of componential light sources with their center wavelengths shifted in an equal step of half the spectrum span, and FIG. 9(c) shows the case of componential light sources with their center wavelengths shifted in different steps.

These interferograms reveal that the multiple light sources with partly overlapping spectrums have their coherence diminished, although peaks of partial interference exist, as compared with the case of light sources of the same center wavelength, and the coherence falls more significantly when the light sources have their center wavelengths shifted from first center wavelength ($\lambda_1$) by a multiple of the shift value ($\lambda_2-\lambda_1$) from the first center wavelength to a neighboring second center wavelength ($\lambda_1$).

Figure 10A:
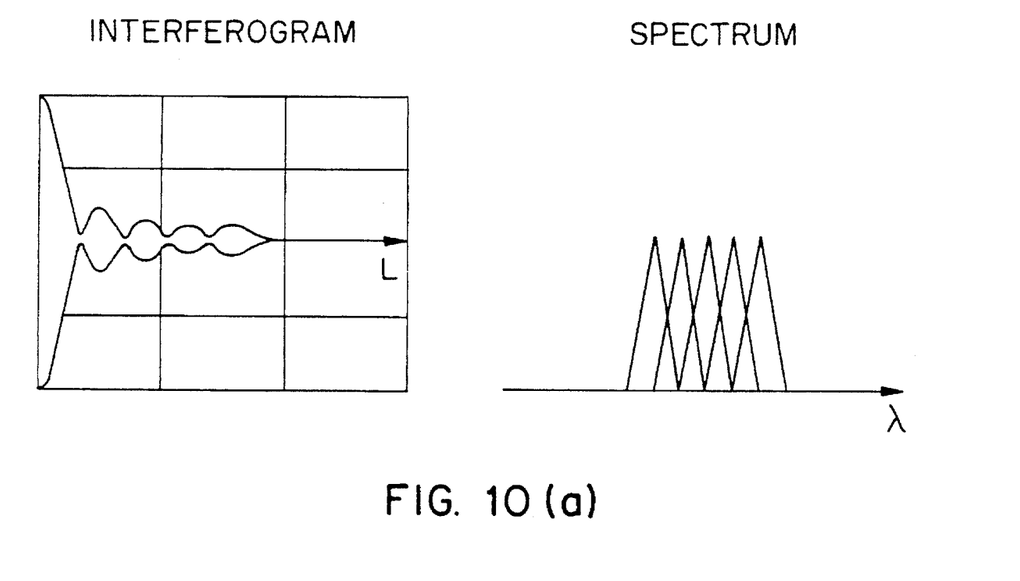
FIGS. 10(a) and (b) are a set of diagrams showing interferograms resulting from several spectrums of five componential light sources.
Figure 10B:
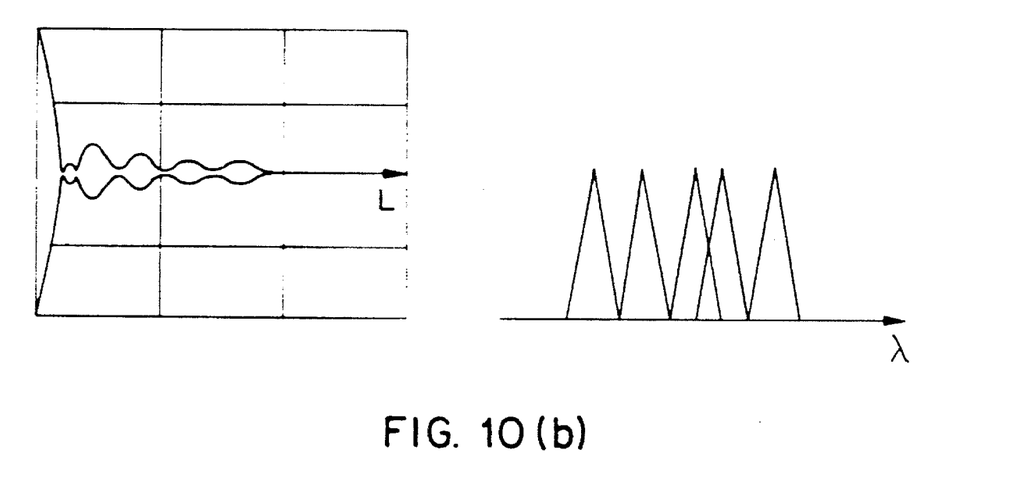

The number of componential light sources is not confined to three, but five light sources may be used to produce a unified light beam as shown in FIG. 10, for example. FIG. 10(a) shows the interferogram resulting from five componential light sources with their center wavelengths shifted in an equal step of half the spectrum span, and the comparison with FIG. 9 reveals that increasing the number of light sources more diminishes the coherence. FIG. 10(b) shows the interferogram resulting from five componential light sources with uneven separation of center wavelengths.

In the light-wave distance meter, there is virtually no difference in the light path in the same mode of the optical fiber, and the difference of light path in the atmosphere cannot be identified. Accordingly, it is advantageous to make the range of primary coherence as small as possible. On the other hand, the presence of multiple light paths, which is suggested by the emergence of secondary interference, enables the averaging of the light propagation characteristics.

The light source of the foregoing embodiment is capable of diminishing the coherence effectively through the separation of center wavelengths of componential light sources by the amount of a half or more of the spectrum span even in the case of a narrow emission spectrum of semiconductor laser, and it is useful for the light source of light-wave distance meters.

Although the light source 1 of this embodiment is based on the semiconductor laser, the inventive arrangement of light source device is also applicable to other kinds of light source.

The inventive light-wave distance meter is designed such that a light source emits a reference modulated light beam, an optical means radiates the light beam provided by the light source to the target of measurement, a light beam reception means receives a return light beam from the target and transduces it into an electrical pulse signal, and a distance measuring means calculates the distance to the target based on the time difference between the light beam radiation and reception. The light source has multiple light emitting areas separated spatially, enabling the radiation of a low coherence and high intensity light beam, and consequently the maximum measurable distance can be extended.

The inventive light source device may be modified such that the reference modulated light beams emitted by the componential light sources are unified by means of an optical guide or an optical fiber.

The inventive light source device is designed such that the reference modulated light beams of componential light sources have their center wavelengths shifted by the amount of a half or more of the spectrum span so that the coherence is diminished, and consequently it is an optimal light source for light-wave distance meters.

The inventive light source device is designed to emit light beams, with their center wavelengths being shifted by the amount of a half or more of the spectrum span, from multiple light emitting areas separated spatially, and unify these light beams with the merging means, and consequently a light beam of low coherence can be produced with a small number of componential light sources.

The inventive light source device may be designed such that the componential light sources have their center wavelength shifted from a first center wavelength by a multiple of the shift value from the first center wavelength to a neighboring second center wavelength, and the resulting low-coherence light source drastically extends the maximum measurable distance of the light-wave distance meter.

The inventive light source device may be designed to emit a reference modulated light beam based on a plurality of separate pulse-type semiconductor lasers or a set of piled pulse-type semiconductor lasers.

What is claimed is:

1. A light-wave distance meter comprising:

a light source device for emitting reference modulated light beams from a plurality of spatially-separated light emitting areas, said light beams having different center wavelengths;

optical guide means for unifying said reference modulated light beams emitted from said light emitting areas;

optical means for radiating a light beam produced from the light beams emitted by said light source device to a target of distance measurement;

light beam reception means for receiving a reflected return light beam from the target and transducing the return light beam into an electrical pulse signal; and distance measuring means for calculating the distance to the target based on the time difference between the radiation of the reference light beam and the reception of the return light beam.

2. A light-wave distance meter according to claim 1, wherein said optical guide means comprises an optical fiber.

3. A light-wave distance meter according to claim 1 or 2, wherein the reference modulated light beams emitted from the light emitting areas of said light source device have their center wavelengths shifted with respect to the center wavelengths of the other reference modulated light beams by the amount of a half or more of the spectrum span of said reference modulated light beams.

4. A light source device comprising:

light source means for emitting reference modulated light beams, with their center wavelengths being shifted with respect to the center wavelengths of the other reference modulated light beams by the amount of a half or more of the spectrum span of said reference modulated light beams, from a plurality of spatially-separated light emitting areas; and merging means for unifying the light beams emitted by said light source means.

5. A light source device comprising:

light source means for emitting a plurality of reference modulated light beams comprising a first light beam having a first center wavelength, a second light beam having a neighboring second center wavelength, and a third light beam having a third center wavelength which is shifted from the first center wavelength by a multiple of the difference between the second wavelength and the first wavelength; and merging means for unifying the light beams emitted by said light source means.

6. A light-wave distance meter according to claim 1 or 2, wherein said light source device comprises the light source device set forth in claim 5 or 6.

7. A light-wave distance meter according to claim 1 or 2, wherein the reference modulated light beam produced by said light source is produced from light beams emitted by a plurality of pulse-type semiconductor lasers.

8. A light-wave distance meter according to claim 7, wherein said light source device comprises a set of piled pulse-type semiconductor lasers.

* * * * *

UNITED STATES PATENT AND TRADEMARK OFFICE
CERTIFICATE OF CORRECTION

PATENT NO. : 5,532,813
DATED : July 2, 1996
INVENTOR(S) : Ohishi et al.

It is certified that error appears in the above-indentified patent and that said Letters Patent is hereby corrected as shown below:

Column 2, line 62, "set Of" should read --set of--;

Column 7, line 56, "sinc" should read --sine--;

Column 8, line 52, "from" should read --from a--;

Column 8, line 55, "($\lambda_1$)" should read --($\lambda_2$)--;

Column 10, line 51, "claim 5 or 6" should read --claim 4 or 5--.

Signed and Sealed this

Fifth Day of November, 1996

Attest:

BRUCE LEHMAN

Attesting Officer    Commissioner of Patents and Trademarks